(12) United States Patent
Lee et al.

(10) Patent No.: US 11,571,621 B2
(45) Date of Patent: Feb. 7, 2023

(54) COMPANION DISPLAY MODULE TO A MAIN DISPLAY SCREEN FOR DISPLAYING AUXILIARY INFORMATION NOT DISPLAYED BY THE MAIN DISPLAY SCREEN AND A PROCESSING METHOD THEREFOR

(71) Applicant: Creative Technology Ltd, Singapore (SG)

(72) Inventors: Yee Shian Lee, Singapore (SG); Chee Kin Cheong, Singapore (SG); Feng Xu, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/387,370

(22) Filed: Apr. 17, 2019

(65) Prior Publication Data

US 2019/0240576 A1     Aug. 8, 2019

Related U.S. Application Data

(63) Continuation of application No. 15/666,769, filed on Aug. 2, 2017, now abandoned.

(30) Foreign Application Priority Data

Aug. 4, 2016    (SG) ........................... 10201606458W

(51) Int. Cl.
*A63F 13/52* (2014.01)
*A63F 13/26* (2014.01)
(Continued)

(52) U.S. Cl.
CPC .............. *A63F 13/52* (2014.09); *A63F 13/25* (2014.09); *A63F 13/26* (2014.09); *A63F 13/327* (2014.09);
(Continued)

(58) Field of Classification Search
CPC .......... A63F 13/52; A63F 13/25; A63F 13/26; A63F 13/327; A63F 13/53; G06F 3/1423
See application file for complete search history.

(56) References Cited

U.S. PATENT DOCUMENTS 9,628,858 B2     4/2017  Zilberstein et al.
2010/0113148 A1*  5/2010  Haltovsky ............. A63F 13/235
                                                          463/30
(Continued)

FOREIGN PATENT DOCUMENTS

WO     2010091514 A1    8/2010

OTHER PUBLICATIONS

Alexandra Holloway, Robert DeArmond, Michelle Francoeur, David Seagal, Amy Zuill, Sri Kurniawan, Visualizing Audio in a First-Person Shooter With Directional Sound Display, GAXID'11 Jun. 28, 2011 Bordeaux, France. (Year: 2011).*

*Primary Examiner* — Yingchuan Zhang
(74) *Attorney, Agent, or Firm* — Russell Swerdon; Desmund Gean

(57) ABSTRACT

There is provided an electronic device operable with a computer. The computer can be configured to run/execute a program which can be associated with graphic based data and audio based data. The computer can include a main display screen which can be configured to display information based on graphic based data. The electronic device can include a display module which can be configured to display auxiliary information. Auxiliary information displayed by the display module, but not the main display, is derivable based on audio based data.

8 Claims, 4 Drawing Sheets

(51) Int. Cl.
- *A63F 13/53* (2014.01)
- *A63F 13/25* (2014.01)
- *A63F 13/327* (2014.01)
- *G06F 3/14* (2006.01)
- *A63F 13/54* (2014.01)
- *G06F 3/04842* (2022.01)

(52) U.S. Cl.
CPC ............ *A63F 13/53* (2014.09); *G06F 3/1423* (2013.01); *A63F 13/54* (2014.09); *G06F 3/04842* (2013.01)

(56) References Cited

U.S. PATENT DOCUMENTS

| | | |
|---|---|---|
| 2011/0300930 A1 | 12/2011 | Hsu |
| 2012/0200667 A1 | 8/2012 | Gay et al. |
| 2016/0023116 A1 | 1/2016 | Wire et al. |
| 2017/0165569 A1* | 6/2017 | van Welzen ............ A63F 13/30 |

* cited by examiner

COMPANION DISPLAY MODULE TO A MAIN DISPLAY SCREEN FOR DISPLAYING AUXILIARY INFORMATION NOT DISPLAYED BY THE MAIN DISPLAY SCREEN AND A PROCESSING METHOD THEREFOR

CROSS-REFERENCE TO RELATED APPLICATION

This application is a continuation of U.S. patent application Ser. No. 15/666,769, filed 2 Aug. 2017 and entitled "COMPANION DISPLAY MODULE TO A MAIN DISPLAY SCREEN FOR DISPLAYING AUXILIARY INFORMATION NOT DISPLAYED BY THE MAIN DISPLAY SCREEN AND A PROCESSING METHOD THEREFOR", which claims the benefit of priority from Singapore Patent Application No. 10201606458W, filed 4 Aug. 2016 and entitled "A COMPANION DISPLAY MODULE TO A MAIN DISPLAY SCREEN FOR DISPLAYING AUXILIARY INFORMATION NOT DISPLAYED BY THE MAIN DISPLAY SCREEN AND A PROCESSING METHOD THEREFOR", the entirety of which are incorporated by reference for all purposes.

FIELD OF INVENTION

The present disclosure generally relates to a computer having a main display screen for displaying information and an electronic device having a companion display module, to the main display screen, which displays auxiliary information not displayed by the main display screen.

BACKGROUND

Generally, in gaming, the computer on which the game is played displays game based graphics as a gamer plays the game.

As games become more sophisticated, graphics displayed generally become more detailed. Moreover, as gamers play a game by controlling a game character, it is appreciable that the computer screen generally shows graphics related to the controlled game character. Such related graphics include, for example, changing scenarios as the game character is moved and/or actions related to the controlled game character.

However, it is appreciable that at the same time activities of the gamer controlled game character is shown on the computer screen, activities of other characters in the game which may be computer controlled and/or controlled by another gamer (e.g., in the case of a Massively Multiplayer Online Role Playing Game) need not necessary be visually perceivable via the computer screen. For example, other characters (i.e., other than the aforementioned gamer controlled game character) may be moving in the background and do not appear in the scene where the aforementioned gamer controlled game character appears at a current point in time. Specifically, the other characters need not necessarily appear in the same scene as the gamer controlled game character. Therefore, activities (e.g., movement) of these other characters which may be of interest to the gamer may, unfortunately, not be visually perceivable via the computer screen at a current point in time when the gamer controlled game character is shown.

Therefore, gaming experience may be detracted as capability of the computer screen to appropriately provide display for sophisticated games (e.g., a Massively Multiplayer Online Role Playing Game) may be limited.

It is therefore desirable to provide a solution to address the foregoing problem.

SUMMARY OF THE INVENTION

In accordance with an aspect of the disclosure, there is provided an electronic device operable with a computer. The computer can be configured to run/execute a program which can be associated with graphic based data and audio based data.

The computer can include a main display screen which can be configured to display information based on graphic based data.

The electronic device can include a display module (e.g., a supplementary display screen) which can be configured to display auxiliary information.

Auxiliary information can be related to information being displayed via the main display screen. Moreover, such auxiliary information is not displayed by the main display screen. Specifically, auxiliary information is not visually perceivable via the main display screen at the same point in time the main display screen displays the aforementioned information based on graphic based data. Furthermore, auxiliary information displayed by the display module, but not the main display screen, can be derived based on audio based data.

In one embodiment, auxiliary information displayed via the display module relates to an object of interest. The object of interest can be associated with audio based data audibly perceivable via the computer. The graphic based data can, for example, be associated with an environment and auxiliary information is associable with approximate location of the object of interest within the environment. Moreover, audio based data associated with the object of interest corresponds to sound effect associated with the object of interest.

In accordance with another aspect of the disclosure, there is provided a processing method associated with a system which can include a computer and an electronic device. The computer can be configured to signal communicate with the electronic device.

The processing method can include a selection step where a user of the computer selects an object of interest and an identification step where audio based data associated with the selected object of interest is identified at the computer.

The processing method can also include a derivation step where supplementary signals are generated, at the computer, based on the identified audio based data.

Moreover, the processing method can include a transmission step where generated supplementary signals are communicated from the computer to the electronic device and an output step where received supplementary signals are processed to generate at least one visual cue visually perceivable via the electronic device but not the computer.

BRIEF DESCRIPTION OF THE DRAWINGS

Embodiments of the disclosure are described hereinafter with reference to the following drawings, in which.

DETAILED DESCRIPTION

Representative embodiments of the disclosure, for addressing the foregoing problem(s), are described hereinafter with reference to FIG. 1 and FIG. 2.

Specifically, the present disclosure contemplates an electronic device having a display module which is capable of functioning as, for example, a complementary display. The electronic device can be operated with a computer having a screen. In this regard, the screen of the computer can be considered a main display screen and the display module of the electronic device can be considered to be, for example, a supplementary display relative to the main display screen. The supplementary display can be in the form of, for example, a supplementary display screen which can be considered to be a complementary display screen to the main display screen. Preferably, the electronic device is a portable type device which can be configured to display, via its display module, information auxiliary to information being displayed by the main display screen. Therefore, the display module can display auxiliary information with reference to information being displayed by the main display screen. Preferably, such auxiliary information is not displayed by/visually perceivable via the main display screen and can be derived via audio based data audibly perceivable via the computer as will be discussed with reference to FIG. 1 and FIG. 2 hereinafter.

Figure 1A:
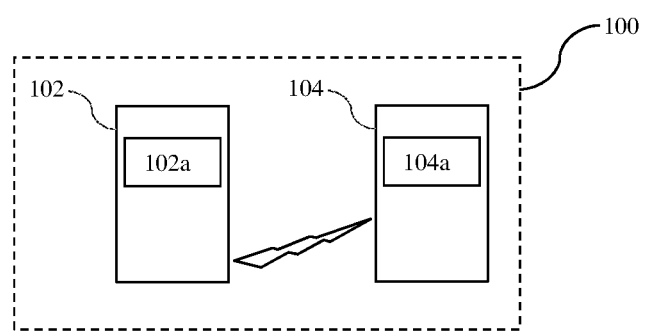
FIG. 1a shows a system which can include a computer which can communicate with an electronic device, according to an embodiment of the disclosure.

FIG. 1a shows a system 100 in accordance with an embodiment of the disclosure. The system 100 can include a computer 102 (e.g., Smartphones, Tablets, Laptops, Desktop computers) which is suitable for gaming. The system 100 can further include an electronic device 104 (e.g., Smartphones, Tablets, Laptops, pointing devices such as a mouse, keyboards or another computer similar to the computer 102). The computer 102 can be coupled to the electronic device 104 such that the computer 102 can communicate with the electronic device 104. Coupling between the computer 102 and the electronic device 104 can be via one or both of wired coupling and wireless coupling.

Each of the computer 102 and the electronic device 104 can include a body such as a casing (not shown) shaped and dimensioned to carry, respectively, a screen 102a and a display module 104a. The screen of the computer 102 can be considered a main display screen 102a and the display module 104a of the electronic device 104 can be considered a supplementary display 104a relative to the main display screen 102a. In general, the main display screen 102a displays information generated in respect of the computer 102 at a current point in time and the supplementary display 104a displays information related to that being displayed by the main display screen 102a, but such related information (i.e., displayed by the supplementary display 104a) is not displayed by the main display screen 102a at that same current point in time. Therefore, it is appreciable that the supplementary display 104a displays information auxiliary to information being displayed by the main display screen 102a. Specifically, the supplementary display 104a can display auxiliary information with reference to information being displayed by the main display screen 102a. As such, the supplementary display 104a can be considered to be a companion/complementary display (e.g., a companion/complementary display screen) to the main display screen 102a.

Since auxiliary Information is displayed only via the supplementary display screen 104a and not the main display screen 102a and such auxiliary information is related to information being displayed by the main display screen 102a, it is appreciable that there is a need to derive such auxiliary information. As will be discussed in further detail with reference to an exemplary scenario, such auxiliary information can be derived using, for example, audio based data generated by, and audibly perceivable via, the computer 102.

The system 100 will be discussed in further detail with reference to FIG. 1b hereinafter.

Figure 1B:
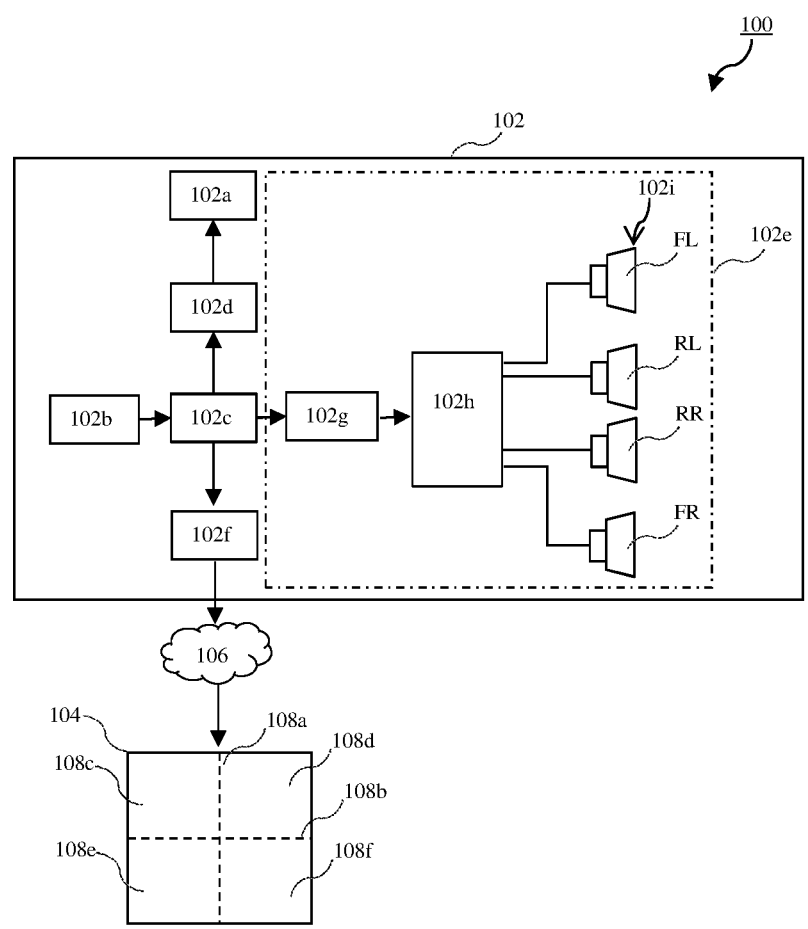
FIG. 1b shows the computer and the electronic device of FIG. 1a in further detail, according to an embodiment of the disclosure.

Referring to FIG. 1b, the computer 102 can further include an input portion 102b, a processing portion 102c, a visual portion 102d, an audio portion 102e and a transceiver portion 102f. The body (e.g., casing) of the computer 102 can be further shaped and dimensioned to carry the input portion 102b, the processing portion 102c, the visual portion 102d, the audio portion 102e and the transceiver portion 102f.

The visual portion 102d can include a display driver (not shown). The audio portion 102e can include an audio processor 102g, an audio amplifier 102h and a plurality of speaker drivers 102i.

The input portion 102b can be coupled to the processing portion 102c. The processing portion 102c can be coupled to each of the visual portion 102d, the audio portion 102e and the transceiver portion 102f.

In regard to the visual portion 102d, the display driver can be coupled to the processing portion 102c. The display driver can be further coupled to the main display screen 102a.

In regard to the audio portion 102e, the audio processor 102g can be coupled to the processing portion 102c. The audio processor 102g can be further coupled to the audio amplifier 102h. The audio amplifier 102h can be coupled to the plurality of speaker drivers 102i. In one example, the plurality of speaker drivers can include a first speaker driver, a second speaker driver, a third speaker driver and a fourth speaker driver. The first speaker driver can, for example, correspond to a front left (i.e., "FL" as indicated in FIG. 1b) channel speaker. The second speaker driver can, for example, correspond to a front right (i.e., "FR" as indicated in FIG. 1b) channel speaker. The third speaker driver can, for example, correspond to a rear left (i.e., "RL" as indicated in FIG. 1b) channel speaker. The fourth speaker driver can, for example, correspond to a rear right (i.e., "RR" as indicated in FIG. 1b) channel speaker. Audio output from the computer 102 can be via the plurality of speaker drivers 102i. In a more specific example, audio output from the computer 102 can include FL audio output, FR audio output, RL audio output and/or RR audio output via the FL channel speaker, the FR channel speaker, the RL channel speaker and/or the RR channel speaker respectively.

Earlier mentioned, coupling between the computer 102 and the electronic device 104 can be via one or both of wired coupling and wireless coupling.

In regard to wireless coupling, the computer 102 can be coupled to the electronic device 104 via a communication network 106. Specifically, the computer 102 can be configured to wirelessly signal communicate with the electronic device 104 via the communication network 106. The communication network 106 can include, for example, Bluetooth based communication, Infrared based communication and/or Wi-Fi based communication.

In regard to wired coupling, the computer 102 can be coupled to the electronic device 104 via hardwiring. For example, the computer 102 can be coupled to the electronic device 104 via a cable (not shown).

The electronic device 104 display module 104a (i.e., also referable as supplementary display 104a) can, in one embodiment, be configured for display in accordance with audio output from the computer 102. Moreover, the supplementary display 104a can be in the form of a display screen.

More specifically, display by the supplementary display 104a can, for example, be partitioned based on audio output from the computer 102. Yet more specifically, the supplementary display 104a can, for example, be partitioned into four sections corresponding to the FL channel speaker, the FR channel speaker, the RL channel speaker and the RR channel speaker.

As shown, display by the supplementary display 104a can be partitioned into four equal sections by a vertical axis 108a and a horizontal axis 108b, in accordance with an embodiment of the disclosure. In this regard, the display by the supplementary display 104a can, for example, be partitioned into a first quarter 108c indicative of FL audio output, a second quarter 108d indicative of FR audio output, a third quarter 108e indicative of RL audio output and a fourth quarter 108f indicative of RR audio output. It should be noted that the vertical and horizontal axes 108a/108b are included in this discussion to merely illustrate a possible manner of demarcating display by the supplementary display 104a and need not necessarily be visually perceivable (i.e., the vertical and horizontal axes 108a/108b can be imaginary lines which are not visually perceivable).

Operationally, the processing portion 102c can be configured to run/execute a software program. Based on the software program being run, output signals can be generated and communicated from the processing portion 102c. Output signals can include one or both of visual based output signals and audio based output signals. In this regard, the software program can be associated with one or both of graphics based data and audio based data which can be processed to generate, respectively, visual based output signals and audio based output signals.

Visual based output signals can be communicated to the visual portion 102d for further processing (e.g., by the display driver) so that the visual based output signals can, for example, be in a format suitable for display (i.e., visually perceivable by a user) of graphics by the main display screen 102a.

Audio based output signals can be communicated to the audio portion 102e for further processing. Specifically, the audio based output signals can be processed by the audio processor 102g and the audio amplifier 102h. The processed audio based output signals can be output via the plurality of speaker drivers 102i for audible perception by a user. For example, audio based output signals can include a FL channel signal, a FR channel signal, a RL channel signal and a RR channel signal. The FL channel signal, the FR channel signal, the RL channel signal and the RR channel signal can be processed by the audio processor 102g and the audio amplifier 102h. The processed FL channel signal, the processed FR channel signal, the processed RL channel signal and the processed RR channel signal can be output by the FL channel speaker, the FR channel speaker, the RL channel speaker, the RR channel speaker respectively. Outputs from the FL channel speaker, the FR channel speaker, the RL channel speaker, the RR channel speaker can be referred to as FL audio output, FR audio output, RL audio output and RR audio output respectively.

Input signals can be generated, by a user operating the input portion 102b (e.g., a keyboard or a pointing device such as a mouse), and communicated to processing portion 102c. The processing portion 102c can be configured to process the graphic based data and/or the audio based data based on the input signals to produce, respectively, visual based output signals and/or audio based output signals.

The processing portion 102c can be further configured to process one or both of the graphics based data and the audio based data to produce supplementary signals which can be communicated to the electronic device 104. The graphics based data and/or audio based data can be processed by the processing portion 102c based on the input signals. Preferably, the supplementary signals are communicated to the transceiver portion 102f which transmits the supplementary signals to the electronic device 104 wirelessly via the communication network 106.

Based on the supplementary signals, auxiliary information can be displayed via the supplementary display 104a as will be discussed with reference to an exemplary scenario per FIG. 1c hereinafter.

Figure 1C:
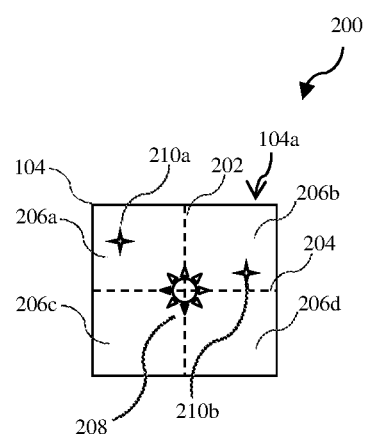
FIG. 1c shows an exemplary scenario where the computer of FIG. 1a can be a gaming laptop and the electronic device 104 of FIG. 1a can be a Smartphone, according to an embodiment of the disclosure.

Referring to FIG. 1c, in one exemplary scenario 200, the computer 102 can be a gaming laptop and the electronic device 104 can be a Smartphone having a display screen. In this regard, the aforementioned display module/supplementary display 104a can be in the form of a display screen. Hence, the aforementioned display module/supplementary display 104a can be referred to as a supplementary display screen 104a hereinafter.

The supplementary display screen 104a can be configured for coordinate graph type display in which a vertical axis 202 and a horizontal axis 204 section the supplementary display screen 104a into four equal sections. In this regard, the supplementary display screen 104a can be partitioned into a first quadrant 206a indicative of a FL based location, a second quadrant 206b indicative of a FR based location, a third quadrant 206c indicative of a RL based location and a fourth quadrant 206d indicative of a RR based location. Additionally, a point of origin 208 can be displayed. The point of origin 208 can be a reference point which is indicative that there is no output from each of the FL channel speaker, the FR channel speaker, the RL channel speaker and the RR channel speaker in respect of sound effect of interest (i.e., each of the FL channel signal, FR channel signal, RL channel signal and the RR channel signal can be quantified to be 0 dB by the processing portion 102c, in relation to the sound effect of interest). Moreover, one or more visual cues 210a/210b (i.e., visual indication(s)) can be displayed based on the FL channel signal, FR channel signal, RL channel signal and/or the RR channel signal as will be discussed later in further detail.

The software program executed can be a game based program. The game based program can, for example, be of a war/battle type game genre (i.e., a game which is war/battle themed).

Usually, in a game, there will be one or more game characters and/or a game environment (i.e., graphics based data) which can be visually perceived via the main display screen 102a. In the game, there can be a storyline or game rules and a gamer can play the game in accordance with the storyline or game rules. For example, there may be a need for the gamer to move one or more game characters in a game environment so as to achieve a certain objective. Appreciably, in a game, there can be one or more movable game characters and/or one or more stationary game characters. The movable game character(s) can be moved in accordance with gamer control to achieve a certain objective in the game. Furthermore, the game can include accompanying game audio (i.e., audio based data) such as background music, soundtracks and/or sound effects which can be audibly perceived via the plurality of speaker drivers 102$i$. The game character(s) and game environment can correspond to graphics based data. The accompanying game audio can correspond to audio based data.

Specifically, in a game which is war themed, game characters can include soldiers and the game environment can correspond to a battlefield. An objective of the game can be to neutralize enemy targets. Gamer control can be via the input portion 102$b$ (i.e., input signals generated by a gamer using a keyboard) to, for example, move the soldier(s) and/or to shoot at an enemy target. Sound effects of the game can include gunshots and footsteps (e.g., as the gamer moves the soldiers through the battlefield and/or as the enemy targets move through the battlefield). Sound effects can further include gunshots as enemy targets shoot at soldiers controlled by the gamer. The main display screen 102$a$ can be configured to display the battlefield and soldiers etc (i.e., information displayed by the main display screen 102$a$).

In this regard, audio based data can be associated with game audio. Specifically, audio based data can include, for example, background music, soundtracks and/or sound effects.

Additionally, information displayed by the main display screen 102$a$ can include the game environment, the soldier(s) and/or enemy target(s). Information displayed by the main display screen 102$a$ can further include movement of the soldier(s), movement of the enemy target(s) and/or changes in the game environment as the gamer moves the soldier(s) at a current point in time during gameplay.

The processing portion 102$c$ can, for example, be configured provide an indication and/or perform calculations based on audio based data associated with the FL channel signal, FR channel signal, RL channel signal and/or the RR channel signal. Audio based data associated with each of the FL channel signal, FR channel signal, RL channel signal and the RR channel signal can, for example, be quantified in decibels (dB). Moreover, the FL channel signal, FR channel signal, RL channel signal and the RR channel signal can be indicative of loudness of the FL audio output, the FR audio output, the RL audio output and the RR audio output respectively.

Preferably, the supplementary signals communicated from the computer 102 to the electronic device 104 can be derived based on audio based data. Audio based data can be based on a sound effect of interest to a gamer. The sound effect of interest to a gamer can be associated with an object of interest to the gamer. An object of interest can, for example, include a movable game character such as an enemy target.

In one embodiment, the processing portion 102$c$ can be configured to quantify (e.g., in dB) audio based data associated with each of the FL channel signal, FR channel signal, RL channel signal and the RR channel signal at any point in time when the game is being played by a gamer. Specifically, a sound effect (e.g., gunshots from an enemy target and/or footsteps of an enemy target) of interest can be identified by a gamer and the processing portion 102$c$ can be configured to quantify, in dB, audio based data associated with each of the FL channel signal, FR channel signal, RL channel signal and the RR channel signal in relation to the sound effect of interest (e.g., gunshots from an enemy target and/or footsteps of an enemy target). Based on such quantification, in relation to the sound effect of interest, of audio based data associated with the FL channel signal, FR channel signal, RL channel signal and/or the RR channel signal, supplementary signals can be generated by the processing portion 102$c$ and communicated from the computer 102 to the electronic device 104. A sound effect of interest can be identified by a gamer by manner of, for example, selection of an object of interest as will be discussed later in further detail with reference to FIG. 2.

In another embodiment, the processing portion 102$c$ can be configured to quantify (e.g., in dB) audio based data associated with each of the FL channel signal, FR channel signal, RL channel signal and the RR channel signal at any point in time when the game is being played by a gamer. The processing portion 102$c$ can be further configured to compare audio based data associated with one channel signal (e.g., FL channel signal) with audio based data associated with another channel signal (e.g., FR channel signal). Specifically, a sound effect (e.g., gunshots from an enemy target and/or footsteps of an enemy target) of interest can be identified by a gamer, and the processing portion 102$c$ can be configured to quantify and compare audio based data associated with the FL channel signal, FR channel signal, RL channel signal and/or the RR channel signal in relation to the sound effect of interest (e.g., gunshots from an enemy target and/or footsteps of an enemy target). A sound effect of interest can be identified by a gamer by manner of, for example, selection of an object of interest as will be discussed later in further detail with reference to FIG. 2.

In one example, in relation to the sound effect of interest audibly perceivable at a point in time during gameplay, audio based data associated with the FL channel signal can be quantified to be 6 dB, audio based data associated with the FR channel signal can be quantified to be 3 dB, audio based data associated with the RL channel signal can be quantified to be 0 dB and audio based data associated with RR channel signal can be quantified to be 0 dB. The processing portion 102$c$ can be configured to compare audio based data associated with the FL and FR channel signals (since audio based data associated with the RL and RR channel signals, being 0 dB, can be disregarded). By comparing audio based data associated with the FL and FR channel signals, supplementary signals indicating location of the sound effect of interest during gameplay can be generated. Specifically, given that audio based data associated with the FL channel signal is quantified to be 6 dB whereas audio based data associated with the FR channel signal is quantified to be 3 dB, supplementary signals indicating that, for example, enemy target gunshots can be heard near the front (i.e., between FL and FR channels) closer to the left side (i.e., since audio based data associated with the FL channel signal is 6 dB and audio based data associated with the FR channel signal is 3 dB).

In another example, in relation to the sound effect of interest audibly perceivable at a point in time during gameplay, audio based data associated with the FL channel signal can be quantified to be 0 dB, audio based data associated with the FR channel signal can be quantified to be 5 dB, audio based data associated with the RL channel signal can be quantified to be 0 dB and audio based data associated with the RR channel signal can be quantified to be 2 dB. The processing portion 102$c$ can be configured to compare audio based data associated with the FR and RR channel signals (since audio based data associated with the FL and FR channel signals, being 0 dB, can be disregarded). By comparing audio based data associated with the FR and RR channel signals, supplementary signals indicating location of the sound effect of interest during gameplay can be generated. Specifically, given that audio based data associated with the FR channel signal is quantified to be 5 dB whereas audio based data associated with the RR channel signal is quantified to be 2 dB, supplementary signals indicating that, for example, enemy target gunshots can be heard near the right side (i.e., between FR and RR channels) closer to the front (i.e., since audio based data associated with the FR channel signal is 5 dB and audio based data associated with the RR channel signal is 2 dB).

Appreciably, in this manner (e.g., per earlier discussion concerning the two examples immediately preceding this paragraph), an indication of the approximate location of an enemy target can be provided. Therefore, the supplementary signals can be indicative of an approximate location of an enemy target although the enemy target may not be necessarily visually perceivable via the main display screen 102a at a particular point in time during gameplay when the sound effect of interest (i.e., gunshots from an enemy target) can be audibly perceived. Specifically, an indication of an approximate location of an object of interest (e.g., an enemy target) can be provided via the supplementary display screen 104a based on audio based data even though the object of interest is not visually perceivable via the main display screen 102a at a current point in time during gameplay. Therefore, auxiliary information displayed via the supplementary display screen 104a can relate to the aforementioned approximate location of an object of interest not shown/displayed by the main display screen 102a.

In this regard, the supplementary signals communicated from the computer 102 to the electronic device 104 can be received and processed by the electronic device 104 so as to provide at least one indication (i.e., visual cue(s) 210a/210b) of, for example, an approximate location of an object of interest (e.g., an enemy target).

In an earlier example (i.e., audio based data associated with the FL channel signal can be quantified to be 6 dB, audio based data associated with the FR channel signal can be quantified to be 3 dB, audio based data associated with each of the RL channel signal and the RR channel signal can be quantified to be 0 dB in relation to the sound effect of interest), where based on audio based data, the supplementary signals can indicate that the object of interest (e.g., the enemy target) is approximately located near the front (i.e., between FL and FR channels) closer to the left side (i.e., since audio based data associated with the FL channel signal is 6 dB and audio based data associated with the FR channel signal is 3 dB). The supplementary display screen 104a can display an indication such as a visual cue 210a somewhere in the first quadrant 206a indicating as such.

In another earlier example (i.e., audio based data associated with the FL channel signal can be quantified to be 0 dB, audio based data associated with the FR channel signal can be quantified to be 5 dB, audio based data associated with the RL channel signal can be quantified to be 0 dB and audio based data associated with RR channel signal can be quantified to be 2 dB in relation to the sound effect of interest), where based on audio based data, the supplementary signals can indicate that the object of interest (e.g., the enemy target) is approximately located at the right side (i.e., between FR and RR channels) closer to the front (i.e., since audio based data associated with the FR channel signal is 5 dB and audio based data associated with the RR channel signal is 2 dB). The supplementary display screen 104a can display an indication such as a visual cue 210b somewhere in the second quadrant 206b indicating as such.

Appreciably, for a gamer playing a game using the computer 102, the sound effect of interest (e.g., gunshots from an enemy target, footsteps of an enemy target) may be audibly perceivable from the plurality of speaker drivers 102i. However, the object of interest (e.g., an enemy target) associated with the sound effect of interest may not necessarily be shown (i.e., visually perceivable) on the main display screen 102a even if the sound effect of interest can be audibly perceived at a particular point in time when the game is played. In this regard, information displayed by the main display screen 102a can include the game character(s) moved by the gamer and the game environment whereas auxiliary information such as the object of interest (e.g., a movable enemy target which movement may be computer controlled), which is not displayed by the main display screen 102a when the associated sound of interest can be audibly perceived, can be displayed by the supplementary display screen 104a. Therefore, even if the object of interest is not displayed by the main display screen 102a when the associated sound of interest can be audibly perceived by a gamer, the gamer can still be provided with an approximate location of the object of interest in the game environment by virtue of the aforementioned visual cue(s) 210a/210b displayed by the supplementary display screen 104a.

Moreover, since the approximate location of the object of interest in the game environment can be provided by displaying the aforementioned visual cue(s) 210a/210b via the supplementary display screen 104a, it is appreciable that there is no need to provision any additional space on the main display screen 102a for display of such auxiliary information. Hence there will be no such visual distractions shown on the main display screen 102a which may detract gaming experience. That is, a gamer can have access to desired auxiliary information and yet still fully enjoy the intended display (the movable game character controlled by the gamer and the game environment etc.) on the main display screen 102a without being distracted by display of auxiliary information.

Figure 2:
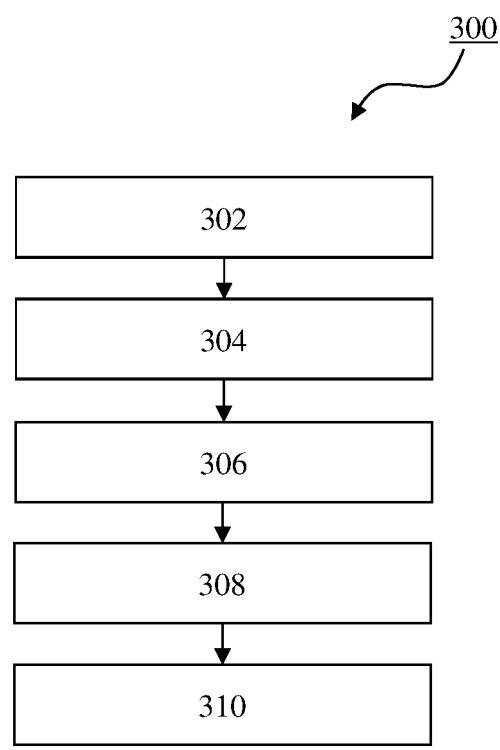
FIG. 2 shows a flow diagram for a processing method in association with the system of FIG. 1a, according to an embodiment of the disclosure.

FIG. 2 shows a flow diagram for a processing method 300 in association with the system 100 of FIG. 1 in accordance with an embodiment of the disclosure. Per earlier discussion, it is appreciable that the system 100 includes a computer 102 and an electronic device 104. The computer 102 is communicable with the electronic device 104.

The processing method 300 can include a selection step 302, an identification step 304, a derivation step 306, a transmission step 308 and an output step 310.

In regard to the selection step 302, a graphics user interface (GUI) can be provided for user selection by a user of the computer 102. The GUI can be displayed by the main display screen 102a. For example, a gamer can be provided with an option to select a desired object of interest (e.g., enemy target). The GUI can, for example, be presented to the gamer as the game program is initialized. Selection of an objection of interest can be by manner of the gamer operating the input portion 102b (e.g., a keyboard or a pointing device such as a mouse) so that input signals communicated to the processing portion 102c can be indicative the gamer's selected object of interest. Therefore, a user of the computer 102 can be able to select an object of interest.

In regard to the identification step 304, the processing portion 102c can be configured to identify audio based data associated with the selected object of interest. For example, the processing portion 102c can be configured to identify the relevant sound effect(s) associated with the selected object of interest. Therefore, audio based data associated with the selected object of interest can be identified at the computer 102.

In regard to the derivation step 306, the processing portion 102c can be configured to generate supplementary signals based on the identified audio based data. Therefore, supplementary signals can be generated, at the computer 102, based on the identified audio based data.

In regard to the transmission step 308, supplementary signals communicated from the processing portion 102c to the transceiver portion 102f can be communicated to the electronic device 104. Therefore, generated supplementary signals can be communicated from the computer 102 to the electronic device 104.

In regard to the output step 310, supplementary signals received by the electronic device 104 can be further processed so that visual cue(s) 210a/210b can be displayed via the display module 104a. As such the gamer can visually perceive auxiliary information displayed by the display module 104a. Therefore, received supplementary signals can be processed to generate auxiliary information which can be visually perceivable via the electronic device 104 but not the computer 102.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, predictive based visual cues can be provided by analyzing historical game play data (e.g., analyzing history of indications 210a/210b displayed by the supplementary display screen 104a) or marked up by global community (e.g., in the case of a Massively Multiplayer Online Role Playing Game). Predictive based visual cues can be generated via, for example, Kalman filtering based signal processing (e.g., by the processing portion 102c).

In another example, options (e.g., via a graphics user interface) can be presented, via the display module 104a, to a gamer running macros such as a series of keystrokes or commands. For example, six graphical buttons, each being customizable by the gamer to turn on/off (i.e., to activate or to deactivate) certain functions/trigger certain activities/trigger certain actions associated with a game run/executed at the computer 102 side can be presented via the display module 104a. In a more specific example, one of the six graphical buttons can be customized to trigger an action by the gamer controlled character (e.g., scouting mode, stealth mode and/or to run from/evade enemy target fire). Therefore, the graphical button(s) can effectively function as shortcut key(s) for game control during gameplay. As can be appreciated, the electronic device 104 can be used as a complementary control device during gameplay and can enhance gaming experience by facilitating ease of control of a game character when a gamer is playing a game.

In yet another example, although a display screen has been used in earlier examples, it is appreciable that the display module 104a can be in other forms. For example, the display module 104a can be in the form of a light emitting diode (LED) array where an appropriate LED is lit according to the supplementary signals received and processed by the electronic device 104. For example, an LED located at the first quadrant 206a can be lit if the supplementary signals indicate that the object of interest is located approximately near the front and closer to the left side.

In yet a further example, although earlier examples are based on the system 100 being a four channel output (e.g., FR channel, FL channel, RL channel and RR channel) system, it is appreciable that the system 100 can be based on any number of channel outputs. For example, the system 100 can be based on six channel outputs where the plurality of speaker drivers 102i further includes another two speaker drivers (e.g., a top channel speaker and a side channel speaker) in addition to the FL channel speaker, the FR channel speaker, the RL channel speaker and the RR channel speaker.

The invention claimed is:

1. An electronic device operable with a computer running a program associable with graphic based data and audio based data, the computer having a main display screen displaying information based on the graphic based data, the information including an user controlled character, the electronic device comprising:
a display module being in the form of a display screen that is configurable to display auxiliary information related to information being displayed via the main display screen, the auxiliary information not being displayed by the main display screen,
wherein the auxiliary information displayed by the display module, but not the main display screen, relates to an object of interest associated with the audio based data, and wherein the auxiliary information is derivable based on the audio based data; and
wherein the display screen is partitioned into sections, each section corresponding to a respective audio output channel signal from one of a plurality of audio output channel signals associated with the audio based data, wherein each of the plurality of audio output channel signals can be quantified in decibels and compared amongst the plurality of audio output channel signals in generating a visual cue on the display screen that spatially corresponds to their relative quantified decibels, and wherein the generated visual cue relates to an approximate location of the object of interest relative to the user controlled character.

2. The electronic device as in claim 1 wherein the object of interest being associable with the audio based data audibly perceivable via the computer.

3. The electronic device as in claim 2 wherein the graphic based data is associable with an environment and the auxiliary information is associable with the approximate location of the object of interest within the environment.

4. The electronic device as in claim 3 wherein the audio based data associated with the object of interest corresponds to sound effect associated with the object of interest.

5. A processing method associated with a system comprising a computer and an electronic device, the computer being communicable with the electronic device, the computer running a program associated with graphic based data and audio based data, the computer having a main display screen displaying information based on the graphic based data, the information including an user controlled character, the processing method comprising:
a selection step where a user of the computer selects an object of interest;
an identification step where the audio based data associated with the selected object of interest is identified at the computer;

a derivation step where supplementary signals are generated, at the computer, based on the identified audio based data;

a transmission step where the generated supplementary signals are communicated from the computer to the electronic device; and an output step where the received supplementary signals are processed to generate at least one visual cue visually perceivable via a display module of the electronic device but not the computer, wherein the display module is partitioned into sections, each section corresponding to a respective audio channel signal from one of a plurality of audio channel signals associated with the audio based data, wherein each of the plurality of audio channel signals can be quantified in decibels and compared amongst the plurality of audio channel signals in the at least one visual cue on the display module that spatially corresponds to their relative quantified decibels, and wherein the generated at least one visual cue relates to an approximate location of the selected object of interest relative to the user controlled character.

6. The processing method as in claim 5, wherein the received supplementary signals are processed such that each of the at least one visual cue is representative of two or more audio channel signals associated with the audio based data.

7. The processing method as in claim 6, wherein each of the at least one visual cue is representative of comparative audio loudness between two or more audio channel signals associated with the audio based data.

8. The processing method as in claim 5, wherein each of the at least one visual cue corresponds to the approximate location of the selected object of interest.

* * * * *